Patented Sept. 13, 1938

2,129,988

UNITED STATES PATENT OFFICE 2,129,988

MERCURIZED HALOGEN METHANE SULPHONIC ACIDS AND THEIR SALTS AND THE PREPARATION THEREOF

Arthur Binz, Berlin, Germany, and Boland Hughes, Carbondale, Pa., assignors to Winthrop Chemical Company, Inc., New York, N. Y., a corporation of New York No Drawing. Application April 1, 1935, Serial No. 14,186. In Germany April 3, 1934

14 Claims. (Cl. 260—503)

This invention has for its object mercurized halogen methane sulphonic acids and their salts and the preparation thereof.

It is known that in certain organic compounds the hydrogen atom or the hydrogen atoms may be replaced by mercury. Further, it is known that in halogen containing organic compounds because of the great affinity of the halogen for mercury the halogen is split off with the formation of mercury halide when these compounds are treated with mercury or certain mercury compounds.

According to the present invention it has surprisingly been found that in halogenated organic compounds containing the halogen together with a free hydrogen atom on the same carbon atom, on treating with mercuric oxide, or the hydrate respectively, in the presence of alkali the hydrogen atom can be replaced by mercury without splitting off the halogen when also sulphonic acid groups are bound to the said carbon atom of the substance serving as starting material. Accordingly, mercurized halogen methane sulphonic acids and their salts may be prepared in which the one valency of the mercury atom is attached to a halogen methane sulphonic acid radical in which at the most two valencies of the carbon atom are bound to sulphonic acid groups, the remaining valencies of the carbon atom being occupied by halogen atoms and in which the other valency of the mercury atom is attached to a halogen methane sulphonic acid group as above specified or to a hydroxyl group.

As starting material for this process halogen methane sulphonic acids are employed to the carbon atom of which are linked one hydrogen atom and at the most two sulphonic acid groups, the remaining valencies being occupied by halogen atoms.

The process is carried out by treating the said halogen methane sulphonic acids, or their salts respectively, with freshly prepared mercuric oxide in the presence of an aqueous alkaline solution, while heating for several hours. The mercuric oxide may for instance be prepared by adding an alkaline solution to a mercury compound capable of yielding mercuric oxide when treated with alkali, such as mercuric chloride, mercuric nitrate, acetate, bromide etc. When working in this manner the mercuric oxide reacts in statu nascendi. It may be mentioned that by the term "mercuric oxide" occurring in the description and the appended claims also mercuric oxide, or the hydrate thereof respectively, is to be understood which has been prepared by the addition of alkaline solutions to mercuric salts in the reaction mixture.

After the non-transformed starting material has been removed by treating the reaction mixture with methyl or ethyl alcohol generally a mercurized halogen methane sulphonic acid is obtained in which the mercury atom is attached to a hydroxyl group, on the one hand, and to the halogen methane sulphonic acid radical, on the other hand. On prolonged heating, however, compounds are obtainable in which both valencies of the mercury are occupied by the halogen methane sulphonic acid group.

The new compounds are generally water-soluble and alcohol-insoluble products. They have proved to be very efficacious for combating plant pests and may advantageously be used as intermediate products for the preparation of therapeutically effective substances.

The invention is further illustrated by the following examples without being restricted thereto:—

*Example 1.*—3.7 grams of the sodium salt of diiodomethane sulphonic acid are heated to boiling with 1.2 grams of freshly precipitated mercuric oxide in a mixture of 10 ccs. of water and 4 ccs. of dilute caustic soda solution. After a short time the reaction mixture solidifies to a crystalline magma.

After filtering the residue is recrystallized from methanol in order to remove the not yet transformed mercuric oxide. The product obtained forms weakly yellow needles which are readily soluble in water and difficultly soluble in methanol. The mercury is complexly bound. The analysis shows the sodium salt of hydroxy mercuric diiodo-methane sulphonic acid of the following formula:

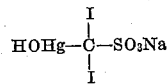

Instead of the sodium salt of diiodo-methane sulphonic acid also other salts, for instance, the potassium, ammonium, lithium, magnesium, calcium and strontium salts may be employed. In this manner corresponding salts of hydroxy mercuric diiodo-methane sulphonic acid are obtained.

On prolonged boiling a second molecule of the sodium salt of diiodo-methane sulphonic acid enters into reaction whereupon probably the sodium salt of mercuric-bis-diiodo-methane sulphonic acid of the formula:

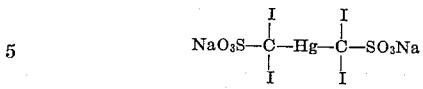

is formed besides the above indicated mercury compound.

When starting from other salts than sodium diiodo-methane sulphonate, for instance, from potassium-, ammonium-, lithium-, calcium-, magnesium- and strontium-diiodo-methane sulphonate the corresponding salts of mercuric-bis-diiodo-methane sulphonic acid are obtained.

Example 2.—1.5 grams of sodium hydroxide in 10 ccs. of water are gradually added to a solution of 4 grams of mercuric chloride in 150 ccs. of water. The separated and washed mercuric oxide after the addition of 0.2 gram of potassium hydroxide is heated under reflux with 10 grams of the potassium salt of mono-iodo-methionic acid and 150 ccs. of water for 4 hours.

From the hot solution about 8 grams of the mercurized products can be precipitated with the seven-fold volume of methanol. The analysis shows the potassium salt of hydroxy-mercuric-mono-iodo-methane-disulphonic acid of the following formula:

Instead of the potassium salt of mono-iodo-methionic acid also, for instance, the ammonium, sodium, lithium, calcium, magnesium or strontium salts of this acid may be used.

Example 3.—2.5 grams of mercuric oxide are dissolved in 5 ccs. of dilute nitric acid and precipitated with dilute caustic soda solution. The filtered and washed mercuric oxide is heated with 3 grams of the sodium salt of mono-bromo-methionic acid in 10 ccs. of water and 1 cc. of dilute caustic soda solution in a sealed tube for 3 hours to 210° C. The white crystalline precipitate which is found in the solution is insoluble in all the ordinary solvents. The filtered solution is concentrated whereupon a colorless substance crystallizes out which is freed from bromide and sulphate by recrystallization from aqueous alcohol. It contains the mercury in organic linkage.

Example 4.—Mercuric oxide is precipitated from 8 grams of mercuric acetate by means of dilute caustic potash solution, and heated with 7.6 grams of the potassium salt of mono-iodo-methionic acid in 100 ccs. of water after 5 ccs. of concentrated caustic potash solution have been added to the boiling solution for half an hour. The solution is then filtered off from the not yet transformed mercuric oxide. The mercuric compound is precipitated from the cold solution by means of concentrated caustic potash solution. The crude product is again precipitated from the aqueous solution by means of concentrated caustic potash solution. The colorless crystals thus obtained according to analysis are the potassium salt of hydroxy-mercuric-iodo-methionic acid.

The same product is obtained when starting with other mercuric compounds yielding mercuric oxide when treated with alkali, for instance, mercuric bromide, mercuric iodide, mercuric chloride, etc.

Example 5.—11 parts by weight of the sodium salt of dibromo-methane sulphonic acid are heated to boiling with 39 parts by weight of mercuric iodide in 100 parts by weight of water. Dilute caustic soda solution is slowly added to the boiling solution drop by drop until all mercuric iodide has entered into solution. From the cold solution the mercuric compound is precipitated after filtering off by means of concentrated caustic soda solution. It is purified by recrystallization from a small quantity of water and boiling with methanol, in order to remove the mercuric iodide. The white needles thus obtained according to analysis are the sodium salt of hydroxy-mercuric-dibromo-methane sulphonic acid.

We claim:—

1. Mercurized organic compound selected from the group consisting of mercurized halogen methane sulphonic acids and salts of the group consisting of the alkali metal, alkaline earth metal (including magnesium) and ammonium salts of such acids in which one valency of the mercury atom is attached to the carbon atom of the halogen methane sulphonic acid radical in which at the most two valencies of the carbon atom are bound to sulphonic acid groups, the remaining valencies of the carbon atom being occupied by halogen, and in which the other valency of the mercury atom is attached to a group selected from the class consisting of the hydroxyl group and the halogen methane sulphonic acid group as specified.

2. Mercurized organic compound selected from the group consisting of mercurized halogen methane sulphonic acids and salts of the group consisting of the alkali metal, alkaline earth metal (including magnesium) and ammonium salts of such acids in which one valency of the mercury atom is attached to the carbon atom of the halogen methane sulphonic acid radical in which two valencies of the carbon atom are bound to sulphonic acid groups, the remaining valency being occupied by a halogen atom, and in which the other valency of the mercury atom is bound to a group selected from the class consisting of the hydroxyl group and the halogen methane sulphonic acid group as specified.

3. Mercurized organic compound selected from the group consisting of mercurized halogen methane sulphonic acids and salts of the group consisting of the alkali metal, alkaline earth metal (including magnesium) and ammonium salts of such acids in which one valency of the mercury atom is attached to the carbon atom of the halogen methane sulphonic acid radical in which at the most two valencies of the carbon atom are bound to sulphonic acid groups, the remaining valencies of the carbon atom being occupied by halogen, and in which the other valency of the mercury atom is attached to a hydroxyl group.

4. Mercurized organic compound selected from the group consisting of mercurized halogen methane sulphonic acids and salts of the group consisting of the alkali metal, alkaline earth metal (including magnesium) and ammonium salts of such acids in which each valency of the mercury atom is linked to the carbon atom of a halogen methane sulphonic acid radical in which at the most two valencies of the carbon atom are bound to sulphonic acid groups, the remaining valencies being occupied by halogen.

5. Mercurized organic compound selected from the group consisting of mercurized halogen methane sulphonic acids and salts of the group consisting of the alkali metal, alkaline earth metal (including magnesium) and amonium salts of such acids in which each valency of the mercury atom is linked to the carbon atom of a halogen methane sulphonic acid radical in which two valencies of the carbon atom are bound to sulphonic acid groups, the remaining valency being occupied by halogen.

6. Mercurized organic compound selected from the group consisting of mercurized halogen methane sulphonic acids and salts of the group consisting of the alkali metal, alkaline earth metal (including magnesium) and ammonium salts of such acids in which one valency of the mercury atom is attached to the carbon atom of the halogen methane sulphonic acid radical in which one valency of the carbon atom is attached to a sulphonic acid group, the remaining two valencies being occupied by halogen atoms, and in which the other valency of the mercury atom is bound to a hydroxyl group.

7. Mercurized organic compound selected from the group consisting of mercurized halogen methane sulphonic acids and salts of the group consisting of the alkali metal, alkaline earth metal (including magnesium) and amonium salts of such acids in which each valency of the mercury atom is bound to the carbon atom of a halogen methane sulphonic acid radical in which one valency of the carbon atom is bound to a sulphonic acid group, the remaining two valencies being occupied by halogen.

8. Mercurized organic compound selected from the group consisting of mercurized halogen methane sulphonic acids and salts of the group consisting of the alkali metal, alkaline earth metal (including magnesium) and ammonium salts of such acids in which one valency of the mercury atom is attached to the carbon atom of the halogen methane sulphonic acid radical in which one valency of the carbon atom is attached to a sulphonic acid group, the remaining two valencies being occupied by iodine and in which the other valency of the mercury atom is bound to a hydroxyl group.

9. Mercurized organic compound selected from the group consisting of mercurized halogen methane sulphonic acids and salts of the group consisting of the alkali metal, alkaline earth metal (including magnesium) and ammonium salts of such acids in which each valency of the mercury atom is bound to the carbon atom of a halogen methane sulphonic acid radical in which one valency of the carbon atom is bound to a sulphonic acid group, the remaining two valencies being occupied by iodine.

10. Mercurized organic compound selected from the group consisting of mercurized halogen methane sulphonic acid salt of the group consisting of the alkali metal, alkaline earth metal (including magnesium) and amonium salts of such acids in which each valency of the mercury atom is bound to the carbon atom of a halogen methane sulphonic acid radical in which one valency of the carbon atom is bound to a sulphonic acid group, the hydrogen atom of which is replaced by an alkali metal, the remaining two valencies being occupied by iodine.

11. The process which comprises heating a halogen methane sulphonic acid salt of the group consisting of the alkali metal, alkaline earth metal (including magnesium) and ammonium salts to the carbon atom of which are linked one hydrogen atom and at the most two sulphonic acid groups, the remaining valencies being occupied by halogen with mercuric oxide in the presence of an aqueous alkaline solution.

12. The process which comprises heating a dihalogenmethanemonosulphonic acid salt of the group consisting of the alkali metal, alkaline earth metal (including magnesium) and ammonium salts with mercuric oxide in the presence of an aqueous alkaline solution.

13. The process which comprises heating a monohalogenmethanedisulphonic acid salt of the group consisting of the alkali metal, alkaline earth metal (including magnesium) and ammonium salts with mercuric oxide in the presence of an aqueous alkaline solution.

14. The process which comprises heating diiodomethanemonosulphonic acid salts of the group consisting of the alkali metal, alkaline earth metal (including magnesium) and ammonium salts with mercuric iodide in the presence of an aqueous alkaline solution.

ARTHUR BINZ.
BOLAND HUGHES.